United States Patent [19]

Hunter

[11] Patent Number: 4,535,150
[45] Date of Patent: Aug. 13, 1985

[54] PROCESS FOR PREPARING EPOXY RESINS HAVING LOW HYDROLYZABLE CHLORINE CONTENTS

[75] Inventor: Joe M. Hunter, Fern Creek, Ky.

[73] Assignee: Celanese Corporation, New York, N.Y.

[21] Appl. No.: 677,711

[22] Filed: Dec. 4, 1984

[51] Int. Cl.³ .............................................. C08G 59/14
[52] U.S. Cl. .................................. 528/489; 525/523; 528/87; 549/542
[58] Field of Search ................... 525/523; 528/87, 489; 549/542

[56] References Cited

U.S. PATENT DOCUMENTS

| | | | |
|---|---|---|---|
| 2,801,227 | 7/1957 | Goppel | 260/46 |
| 3,309,384 | 3/1957 | Shimp et al. | 260/348.6 |
| 3,417,050 | 12/1968 | Price et al. | 260/47 |
| 4,017,523 | 4/1977 | Vargiu et al. | 549/541 X |
| 4,447,598 | 5/1984 | Caskey et al. | 528/489 |

FOREIGN PATENT DOCUMENTS

| | | | |
|---|---|---|---|
| 513388 | 5/1955 | Canada. | |
| 5824578 | 2/1983 | Japan | 301/28 |
| 2120659 | 12/1983 | United Kingdom | 303/18 |

Primary Examiner—Earl Nielsen
Attorney, Agent, or Firm—Herbert P. Price

[57] ABSTRACT

Low hydrolyzable chlorine containing epoxy resins are obtained by conducting a second dehydrohalogenation of the resin in isopropanol or secondary butanol solvent using aqueous alkali metal hydroxide as the dehydrohalogenating agent. Low hydrolyzable chlorine containing epoxy resins when cured have excellent electrical resistance properties.

10 Claims, No Drawings

PROCESS FOR PREPARING EPOXY RESINS HAVING LOW HYDROLYZABLE CHLORINE CONTENTS

BACKGROUND OF THE INVENTION

The field of art to which this invention pertains is glycidyl ethers of polyhydric phenols and polyhydric alcohols.

Glycidyl ethers of polyhydric alcohols and polyhydric phenols are generally prepared by reacting the alcohol or phenol with epichlorohydrin to form a chlorohydrin ether which is then dehydrohalogenated to form the glycidyl ether.

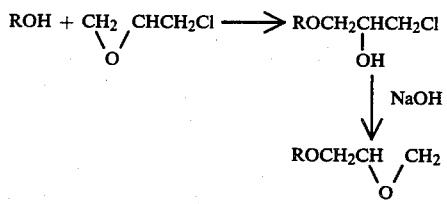

Incomplete dehydrohalogenation of the chlorohydrin ether group results in residual chlorine in the product, said residual chlorine being referred to as hydrolyzable chlorine or active chlorine. This residual hydrolyzable chlorine, even in amounts as low as 0.1 weight percent or less, can be detrimental to the properties, particularly, electrical properties, of the cured resins in many applications.

A process for manufacturing glycidyl ethers of polyhydric phenols is described in U.S. Pat. No. 2,801,227. A polyhydric phenol is dissolved in excess epichlorohydrin, the resulting solution is heated to about 100° C. and aqueous caustic is then added. During the addition, epichlorohydrin and water are distilled over, the water is separated from the distillate and the epichlorohydrin is returned to the reactor. At the end of the reaction, the epichlorohydrin is removed by distillation, the resin is dissolved in a hydrocarbon solvent and the salt formed in the reaction is removed by filtration. The solvent is then removed by distillation. The glycidyl ether products have hydrolyzable chlorine contents of at least about 0.25%.

U.S. Pat. No. 3,309,384 describes a process for preparing glycidyl ethers of polyhydric phenols similar to that described in U.S. Pat. No. 2,801,227. However, after the dehydrohalogenation reaction and removal of epichlorohydrin, the resinous product is dissolved in methylisobutyl ketone and water is added to dissolve and wash out the salt. After separation of the water and salt, sodium hydroxide is added for a second dehydrohalogenation reaction. After washing, neutralization and removal of the solvent, the resulting glycidyl ethers are found to have hydrolyzable chlorine contents of less than 0.1 weight percent.

In U.S. Pat. No. 3,417,050, a manufacturing process for reacting a solution of epichlorohydrin and polyhydric phenol with finely divided caustic dispersed in a hydrocarbon is described. Glycidyl ethers having hydrolyzable chlorine contents as low as 0.07 weight percent are produced.

In Canadian Pat. No. 513,388, a process for preparing glycidyl ethers of polyhydric alcohols is described. Chlorohydrin ethers of the polyhydric alcohols are prepared by reacting the polyhydric alcohol with epichlorohydrin using boron trifluoride catalysts. The chlorohydrin ether so formed is dissolved in acetone and dehydrohalogenated with caustic. The resulting glycidyl ethers have hydrolyzable chlorine contents of less than 0.5%.

U.S. Pat. No. 4,447,598 is specifically directed to a process for reducing the hydrolyzable chlorine of glycidyl ethers to less than 300 ppm by dissolving the hydrolyzable chlorine containing glycidyl ether in a solvent mixture of toluene and methylethyl ketone followed by reaction with aqueous caustic.

In Japanese Patent Application No. 58-24578, the hydrolyzable chlorine content of glycidyl ethers of polyhydric phenols is reduced below 0.1 weight percent by conducting a second dehydrohalogenation of the glycidyl ethers in a polyoxyalkylene glycol or a crown ether solvent with alkali metal hydroxide.

British Patent Application No. 2,120,659A describes a process for preparing low hydrolyzable chlorine containing glycidyl ethers of polyhydric phenols which process involves dissolving the polyhydric phenol in a molar excess of epichlorohydrin plus a cyclic or linear ether, e.g., dioxane or diethoxyethane, followed by reaction with an alkali metal hydroxide.

SUMMARY OF THE INVENTION

This invention pertains to a process for lowering the hydrolyzable chlorine content of epoxy resins.

In carrying out the process of this invention, epoxy resins having a hydrolyzable chlorine content of more than 0.03 weight percent, based on the total weight of the resin, are dissolved in an isopropanol or secondary butanol solvent in the amount of about 50 to about 95 weight percent resin based on the solution weight. To the solution is added an aqueous solution of alkali metal hydroxide in an amount of about 1.2 to about 33 equivalents of hydroxide per each hydrolyzable chlorine equivalent. The reactants are heated at an elevated temperature until the hydrolyzable chlorine content of the epoxy resin has decreased to the desired extent.

The low hydrolyzable chlorine containing epoxy resin product is recovered after distilling off the alcohol solvent, adding acid to neutralize unreacted alkali metal hydroxide and water to wash out the formed alkali metal salts.

The use of isopropanol or secondary butanol as a solvent for the hydrolyzable chlorine dehydrohalogenation produces epoxy resins with low hydrolyzable chlorine contents and with a minimum of epoxide equivalent weight increase and viscosity increase.

DESCRIPTION OF THE INVENTION

Epoxy resins useful in this invention are glycidyl ethers of polyhydric alcohols and polyhydric phenols. The glycidyl ethers of polyhydric phenols are generally prepared by reacting the polyhydric phenol in excess epichlorohydrin using caustic as a catalyst for the reaction and as a dehydrohalogenating agent. Such glycidyl ethers and such reactions are described in U.S. Pat. Nos. 2,801,227; 3,268,619 and 3,309,384, which are hereby incorporated by reference.

Glycidyl ethers of polyhydric alcohols are generally prepared by reacting the polyhydric alcohol with epichlorohydrin equivalent to the hydroxyl groups of the alcohol using a Lewis acid as catalyst. The formed chlorohydrin ether is then dissolved in a solvent and dehydrohalogenated with caustic. Such glycidyl ethers and such reactions are described in U.S. Pat. No. 3,033,803 and Canadian Pat. No. 513,388 which are hereby incorporated by reference.

Preferred epoxy resins for use in the process of this invention are glycidyl ethers of p,p'-dihydroxydiphenyl propane, or Bisphenol A as it is commonly called, having epoxide equivalent weights of about 180 to about 220, and glycidyl ethers of tetrabromo Bisphenol A having epoxide equivalent weights of about 330 to about 450. Generally, the epoxy resins will have hydrolyzable chlorine contents greater than about 0.03 weight percent up to about 0.70 weight percent, but more likely will have hydrolyzable chlorine contents of about 0.07 to about 0.30 weight percent.

Hydrolyzable chlorine content as defined in this invention is determined by the following analytical procedure.

Duplicate samples of the epoxy resin, sample size of approximately 50 gms, are weighed into two 500 ml Erlenmeyer flasks. Toluene, 30 ml, is added to each flask and also to two additional flasks which are to be used as blanks. When solution of the resin is attained, exactly 50 ml of 0.1 N alcoholic potassium hydroxide (5.61 gms potassium hydroxide dissolved in 1 liter of methyl alcohol) are added to each of the four flasks. Air condensers are inserted in each flask and all four flasks are placed on a hot plate adjusted to give a gentle reflux. After refluxing for 15 minutes, the flasks are removed from the hot plate and are cooled to room temperature with condensers in place. The condensers are removed and 100 ml of methylethyl ketone are added to each flask. Each flask's contents are titrated with 0.1 N hydrochloric acid using 6 drops of phenolphthalein indicator. The end point is taken when one drop changes the solution from pink to colorless. The weight percent hydrolyzable chlorine is calculated.

$$\% \text{ Hydrolyzable Chlorine} = \frac{(B - S) \times N \times 3.55}{W \times 0.01}$$

B=Titration of blank in mls.
S=Titration of sample in mls.
N=Normality of the hydrochloric solution
W=Weight of sample in gms.

The solvents used in this invention are isopropanol and secondary butanol. Although each of these solvents can be used alone, it is preferred to use a mixture of the alcohol with a liquid aromatic hydrocarbon or methylisobutyl ketone in order to improve the solubility of some epoxy resins in the solvent. Up to about 75 weight percent of the solvent mixture can be the aromatic hydrocarbon or ketone. Preferably, the solvent mixture will contain about 15 to about 35 weight percent alcohol with the remainder being aromatic hydrocarbon or ketone. Preferred aromatic hydrocarbons are benzene, toluene and xylene with the most preferred being toluene. In carrying out the process of this invention, about 50 to about 95 weight percent, based on total solution weight, of epoxy resin is dissolved in the solvent and, preferably, about 75 to about 85 weight percent.

The alkali metal hydroxide as used in this invention is an aqueous solution having about 30 to about 70 weight percent alkali metal hydroxide in solution and, preferably, about 45 to about 55 weight percent. The preferred alkali metal hydroxides are potassium hydroxide and sodium hydroxide with sodium hydroxide being most preferred.

In carrying out the process of this invention, the hydrolyzable chlorine containing epoxy resin is dissolved in the solvent followed by the addition of the aqueous alkali metal hydroxide. The hydroxide is added in an amount of about 1.2 to about 33 equivalents for each equivalent of hydrolyzable chlorine and, preferably, about 1.2 to about 3.25 equivalents. Heating at an elevated temperature with agitation is continued for a time sufficient to lower the hydrolyzable chlorine to the desired level. Generally, heating is conducted at a temperature of about 130° to about 200° F. and, preferably, at about 140° to about 160° F. The time will be about ½ hour to about 2 hours.

When the reaction is complete, i.e., when the desired reduction in hydrolyzable chlorine is attained, the epoxy resin is recovered by means well-known to those skilled in the art. In a preferred method, the unreacted alkali metal hydroxide is neutralized with dilute aqueous mineral acid and the solvent is removed by distillation. Water is added to wash out the salt. The resin and water are heated and agitated, agitation is stopped, the water layer is allowed to separate and is drawn off. This treatment with water is continued until the resin is salt free.

The following examples describe the invention in more detail. Parts and percentages are parts and percentages by weight unless otherwise indicated.

EXAMPLE 1

To a suitable reactor were added 1500 parts of the diglycidyl ether of tetrabromo Bisphenol A, having an epoxide equivalent weight of 376, a melt viscosity at 300° F. of 80 cps and a hydrolyzable chlorine content of 0.071%, 500 parts of isopropanol and 500 parts of toluene. When solution was attained, 33 parts of a 50% aqueous sodium hydroxide solution were added. Heat was applied raising the temperature to 180° F. After holding the temperature at 180° F. for one hour, 1000 parts of deionized water were added. Heating was continued to distill off the toluene and isopropanol solvent. When the temperature reached 183° F., agitation was stopped to allow two layers to form. The top aqueous layer was drawn off and an additional 1000 parts of deionized water were added. After 15 minutes stirring with the temperature at 178°–181° F., agitation was stopped. The top aqueous layer was drawn off and 970 parts of deionized water were added. After heating and stirring for 30 minutes, agitation was stopped and the top aqueous layer was drawn off and 1000 parts of deionized water were added. After stirring and heating at 176°–190° F. for 30 minutes, agitation was stopped and the top aqueous layer was drawn off. 1.3 parts of 0.1 N hydrochloric acid in 50 parts of water were added followed by the addition of 1000 parts of deionized water. After heating and stirring for 15 minutes at 189°–190° F., agitation was stopped and the top layer, which had a neutral pH, was drawn off. Heat and vacuum were applied to remove the water. After one hour and ten minutes, the temperature was 310° F., and the vacuum was 45 mm Hg. After 30 minutes at 310° F., the removal of water was completed. The resulting product had a hydrolyzable chlorine content of 0.002%, an epoxide equivalent weight of 435 and a melt viscosity at 300° F. of 170 cps.

EXAMPLES 2–11

Additional reactions were carried out on the same epoxy resin used in Example 1. The amount and type of solvents were varied as well as the amount of sodium hydroxide, the temperature of reaction and the time of reaction. The products were washed of salts and sodium hydroxide recovered dry using the same procedures described in Example 1.

The conditions and results of these reactions are tabulated in the Table. "phr" in the Table is parts by weight per hundred parts by weight of resin.

TABLE

| Example | 1 | 2 | 3 | 4 | 5 | 6 | 7 | 8 | 9 | 10 | 11 | Starting Resin |
|---|---|---|---|---|---|---|---|---|---|---|---|---|
| Solvent | Toluene i-Propanol | Toluene i-Propanol | Toluene i-Propanol | Toluene i-Propanol | Toluene i-Propanol | Toluene i-Propanol | Toluene i-Propanol | Toluene Sec-Butanol | Toluene n-Butanol | Toluene Water | Toluene | |
| Solvent Amount phr | 33 33 | 33 33 | 33 33 | 33 33 | 33 33 | 6.7 25 | 25 6.7 | 25 6.7 | 6.7 66 | 33 33 | 33 | |
| 50% Aq. NaOH phr | 2.2 | 2.2 | 2.2 | 0.44 | 0.44 | 0.44 | 0.44 | 0.44 | 2.2 | 7.3 | 2.2 | |
| Reaction Temp. °F. | 180 | 150 | 150 | 150 | 150 | 150 | 150 | 150 | 180 | 180 | 180 | |
| Reaction Time, Hrs. | 1 | 1 | 2 | 1 | ½ | 1 | 1 | 1 | 1 | 1 | 1 | |
| Product Constants | | | | | | | | | | | | |
| Epox. Eq. Wt. | 435 | 383 | 406 | 375 | 387 | 380 | 365 | 362 | 1084 | 371 | 363 | 376 |
| Melt Viscosity 300° F. - cps | 170 | 95 | 125 | 95 | 80 | 100 | 85 | 80 | 240 | 80 | 80 | 80 |
| % Hydrolyzable Cl | 0.002 | 0.007 | 0.002 | 0.001 | 0.001 | 0.008 | 0.002 | 0.003 | 0.006 | 0.071 | 0.075 | 0.071 |

EXAMPLE 12

To a suitable reactor were added 1376 parts of a solution of a diglycidyl ether of tetrabromo Bisphenol A in methylisobutyl ketone having a solids content of 72.7%. The epoxide equivalent of the glycidyl ether was 369 and the hydrolyzable chlorine was 0.021%. The solution was heated to 180° F. and 84 parts of isopropanol and 22 parts of 50% aqueous sodium hydroxide were added. Heating with agitation was continued for 1 hour and 25 minutes with the temperature at 180°–182° F. Water, 122.4 parts, was then added followed by a solution of 11.17 parts of sulfuric acid in 90 parts of water. After a 10 minute period, an additional solution of 44 parts water and 2.43 parts of sulfuric acid was added. Five minutes after the addition, the reactor contents had a neutral pH. The reactor was then equipped for vacuum distillation and vacuum and heat were applied. The temperature was raised to 325° F. and a 45 mm mercury vacuum was attained. After 20 minutes heating under vacuum, vacuum was broken and 250 parts of toluene were added to the reactor. The resulting solution was then filtered through a filter press to remove the salts.

The reaction product had an epoxide equivalent weight of 376 and a hydrolyzable chlorine content of 0.009%. The solids content was 80%.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing epoxy resins having low hydrolyzable chlorine content which comprises
   (a) dissolving the epoxy resin in a solvent in the amount of about 50 to about 95 weight percent resin based on the total weight of resin and solvent wherein the epoxy resin is a derivative of epichlorohydrin and a polyhydric alcohol or polyhydric phenol and which has a hydrolyzable chlorine content of at least about 0.07 weight percent, and wherein the solvent is isopropanol or secondary butanol;
   (b) adding aqueous alkali metal hydroxide in the amount of about 1.2 to about 33 equivalents of hydroxide per hydrolyzable chlorine equivalent of the epoxy resin; and
   (c) heating the reactants at an elevated temperature for a time sufficient to reduce the hydrolyzable chlorine content to the desired level.

2. The process of claim 1 wherein the epoxy resin is a diglycidyl ether of Bisphenol A.

3. The process of claim 1 wherein the epoxy resin is a diglycidyl ether of tetrabromo Bisphenol A.

4. The process of claim 1 wherein the alkali metal hydroxide is sodium hydroxide.

5. The process of claim 1 wherein the solvent is a mixture of liquid aromatic hydrocarbon and isopropanol.

6. The process of claim 5 wherein the aromatic hydrocarbon is toluene.

7. The process of claim 1 wherein the solvent is a mixture of liquid aromatic hydrocarbon and secondary butanol.

8. The process of claim 7 wherein the aromatic hydrocarbon is toluene.

9. The process of claim 1 wherein the solvent is a mixture of methylisobutyl ketone and isopropanol.

10. The process of claim 1 wherein the solvent is a mixture of methylisobutyl ketone and secondary butanol.

* * * * *